UNITED STATES PATENT OFFICE.

CARL BOSCH AND FRANZ LAPPE, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

WORKING WITH HYDROGEN UNDER PRESSURE.

1,075,085.      Specification of Letters Patent.      Patented Oct. 7, 1913.

No Drawing.      Application filed June 5, 1913. Serial No. 771,899.

*To all whom it may concern:*

Be it known that we, CARL BOSCH and FRANZ LAPPE, citizens of the German Empire, residing at Ludwigshafen-on-the-Rhine, Germany, have invented new and useful Improvements in Working with Hydrogen Under Pressure, of which the following is a specification.

When iron apparatus is employed for working with hydrogen (either pure, or in admixture with other gas, or gases), while employing pressure and a raised temperature, the iron often tends to lose its stability and finally becomes useless, or there is danger in continuing the operation under the pressure employed. We have found that these difficulties can be overcome by interposing an atmosphere of nitrogen gas between the hydrogen, or mixture containing hydrogen (which, for the purposes of this invention, is equivalent to hydrogen) and the hot pressure-sustaining wall of the reaction vessel. This can be effected, for instance, by providing a pervious lining to the iron vessel and passing nitrogen through the space between the lining and the iron wall. The nitrogen can then either be led away separately or, if desired, it can be passed into the space inside the lining, where it is allowed to mix with the hydrogen, or gases containing hydrogen.

The process of this invention is of particular value when producing ammonia synthetically from its elements using a hot catalytic agent under pressure.

The reaction vessel can be prepared from any iron which is capable of resisting the pressure.

Now what we claim is:—

In the process of working with hydrogen under increased pressure and at a raised temperature, interposing an atmosphere of nitrogen gas between the hydrogen and the hot pressure-sustaining wall of the reaction vessel.

In testimony whereof we have hereunto set our hands in the presence of two subscribing witnesses.

CARL BOSCH.
FRANZ LAPPE.

Witnesses:
J. ALEC. LLOYD,
JOSEPH PFEIFFER.